United States Patent [19]
Haruta et al.

[11] Patent Number: 4,802,989
[45] Date of Patent: * Feb. 7, 1989

[54] SYSTEM FOR PURIFYING DYE

[75] Inventors: Masahiro Haruta, Funabashi; Kunitaka Ozawa, Tokyo; Takashi Hamamoto, Yokohama, all of Japan

[73] Assignee: Canon Kabushiki Kaisha, Tokyo, Japan

[*] Notice: The portion of the term of this patent subsequent to May 12, 2004 has been disclaimed.

[21] Appl. No.: 925,483

[22] Filed: Oct. 29, 1986

Related U.S. Application Data

[63] Continuation of Ser. No. 635,285, Jul. 27, 1984, abandoned.

[30] Foreign Application Priority Data

| Jul. 28, 1983 | [JP] | Japan | 58-136803 |
| Jul. 28, 1983 | [JP] | Japan | 58-136804 |
| Jul. 28, 1983 | [JP] | Japan | 58-136805 |
| Jul. 28, 1983 | [JP] | Japan | 58-136806 |
| Jul. 28, 1983 | [JP] | Japan | 58-136807 |
| Jul. 28, 1983 | [JP] | Japan | 58-136808 |
| Jul. 28, 1983 | [JP] | Japan | 58-136809 |
| Jul. 28, 1983 | [JP] | Japan | 58-136810 |
| Jul. 28, 1983 | [JP] | Japan | 58-136811 |

[51] Int. Cl.$^4$ ............ B01D 15/04; B01J 47/02
[52] U.S. Cl. ............ 210/688; 210/739; 210/746; 210/96.1; 210/195.1; 210/263; 106/20; 106/22; 106/23; 346/1.1; 346/140 R
[58] Field of Search ............ 106/22, 23, 20; 346/1.1, 75, 140 R; 210/681, 688, 912, 744, 167, 739, 96.1, 85, 101, 198.2, 198.3, 263, 917, 746

[56] References Cited

U.S. PATENT DOCUMENTS

| 3,154,670 | 10/1964 | Gossel | 235/92 |
| 3,705,043 | 12/1972 | Zabiak | 106/20 |
| 3,705,044 | 12/1972 | Pipkins | 106/20 |
| 3,822,203 | 7/1974 | Annino | 210/656 |
| 3,846,141 | 11/1974 | Ostergren et al. | 106/22 |
| 3,999,046 | 12/1976 | Porter | 235/151.1 |
| 4,058,517 | 11/1977 | Bermes | 260/155 |
| 4,153,902 | 5/1979 | Kanayama | 346/75 |
| 4,159,203 | 6/1979 | Loock | 106/22 |
| 4,179,267 | 12/1976 | Lacroix et al. | 8/41 R |
| 4,196,006 | 4/1980 | Mansukhani | 106/22 |
| 4,290,812 | 9/1981 | Loock | 106/22 |
| 4,340,389 | 7/1982 | Nonn et al. | 8/620 |
| 4,346,388 | 8/1982 | Wiley | 210/167 |
| 4,373,954 | 2/1983 | Eida et al. | 106/20 |
| 4,381,946 | 5/1983 | Uehara et al. | 106/22 |
| 4,396,429 | 8/1983 | Matsumoto | 106/20 |
| 4,403,866 | 9/1983 | Falcoff et al. | 366/132 |
| 4,445,124 | 4/1984 | Fujii | 346/1.1 |
| 4,469,602 | 9/1984 | Seal | 210/85 |
| 4,664,815 | 5/1987 | Ozawa et al. | 210/96.1 |
| 4,698,151 | 10/1987 | Ozawa et al. | 210/96.1 |

FOREIGN PATENT DOCUMENTS

| 0025075 | 3/1981 | European Pat. Off. |
| 5592373 | 3/1973 | Japan . |
| 1356121 | 6/1974 | United Kingdom . |
| 1359898 | 7/1974 | United Kingdom . |
| 1566948 | 9/1976 | United Kingdom . |
| 2031448 | 4/1980 | United Kingdom . |

OTHER PUBLICATIONS

Snyder, Introduction to Modern Chromatography, Wiley & Sons, Inc., N.Y., 1979, pp. 519-522.

*Primary Examiner*—Ernest G. Therkorn
*Attorney, Agent, or Firm*—Fitzpatrick, Cella, Harper & Scinto

[57] ABSTRACT

A system for purifying dye comprising a means for producing a dye solution and a means for treating the dye solution which captures metal ions in said dye solution by carrying out ion-exchange separation.

10 Claims, 7 Drawing Sheets

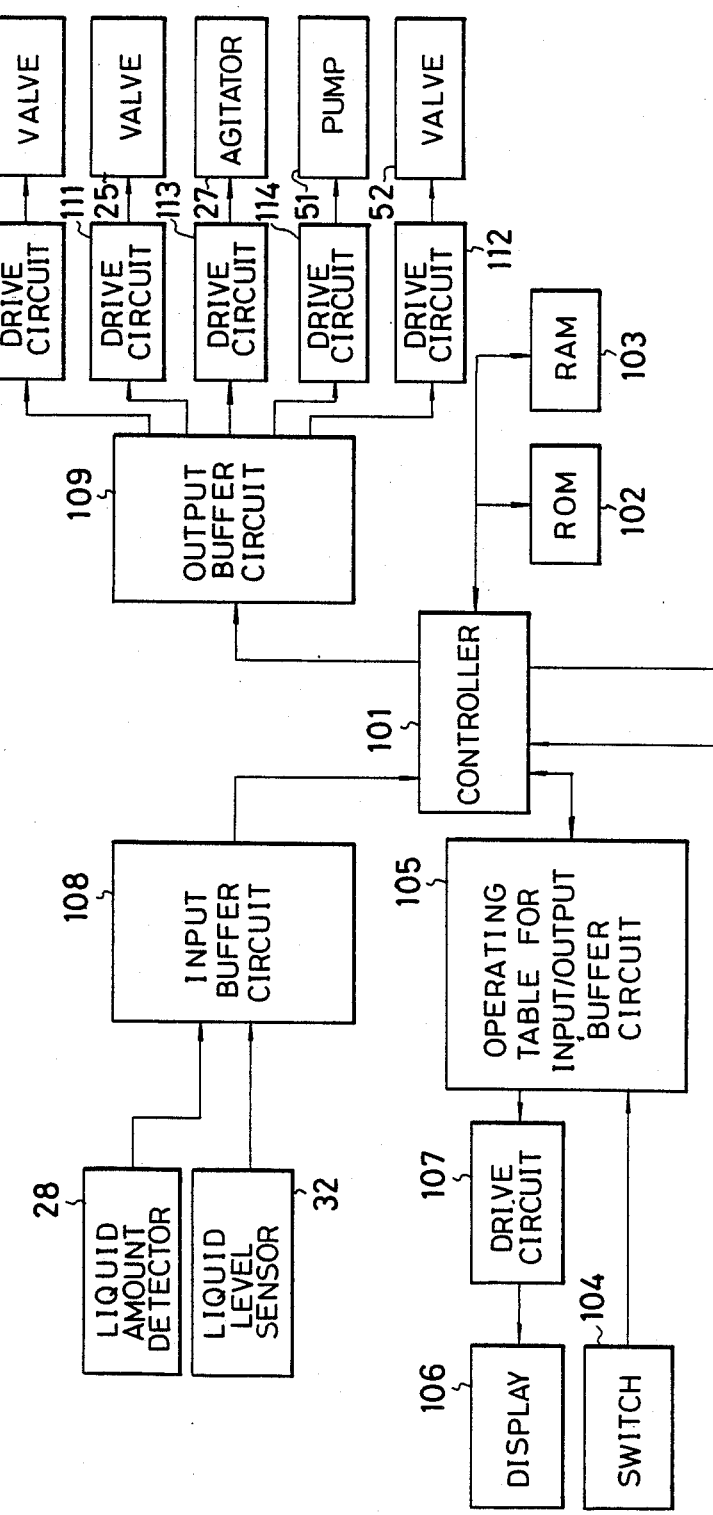

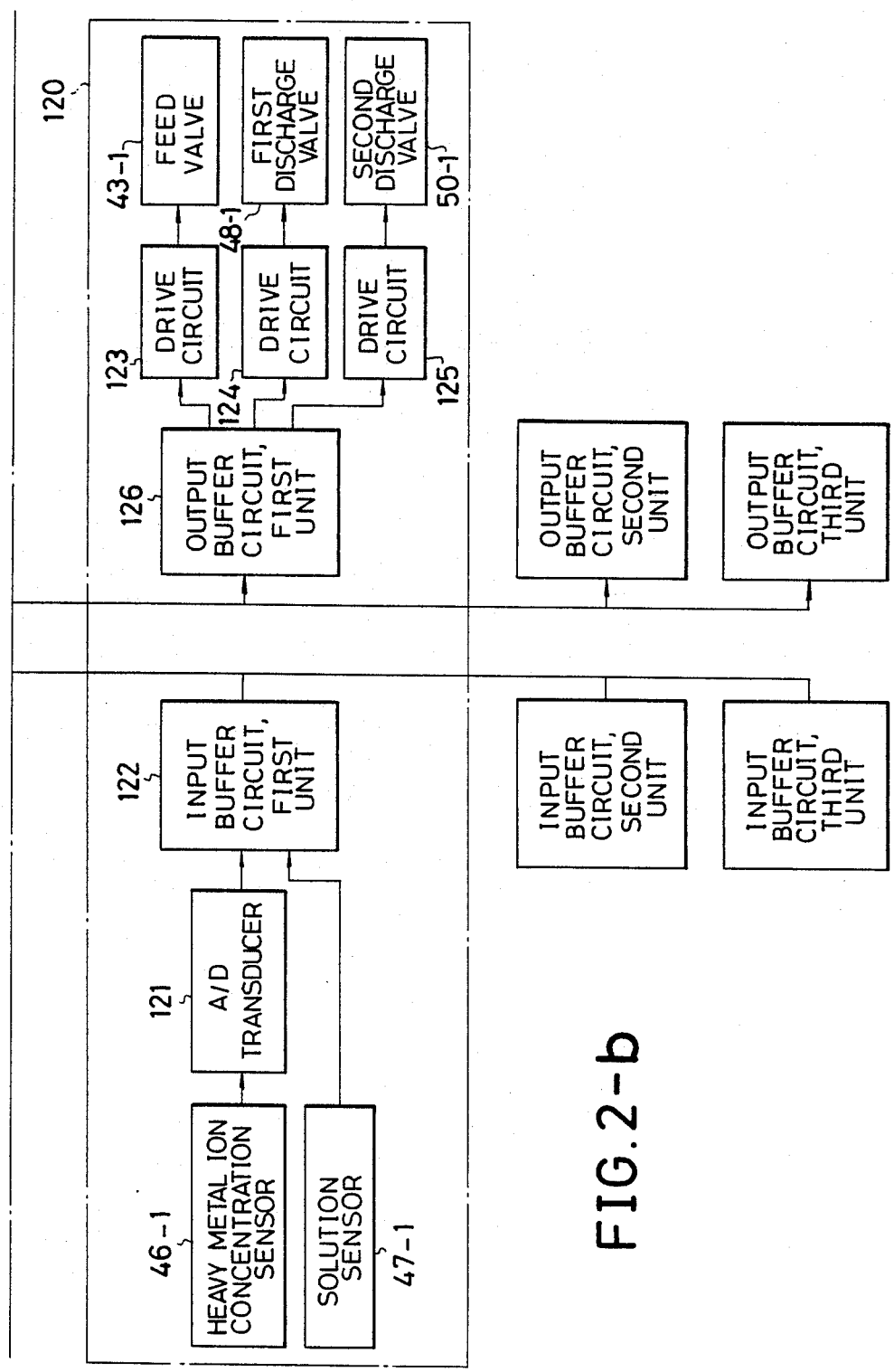
FIG.2-b

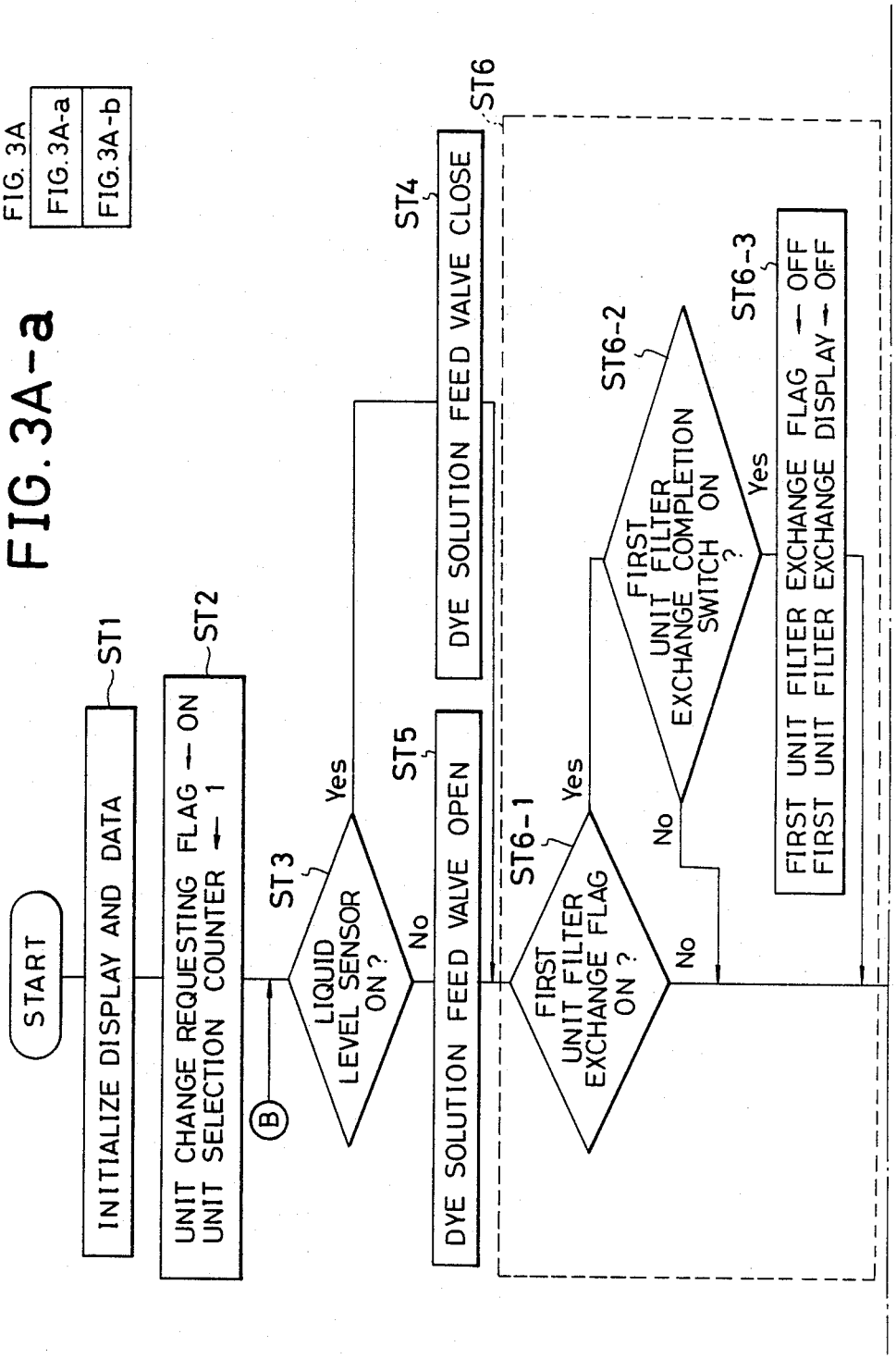

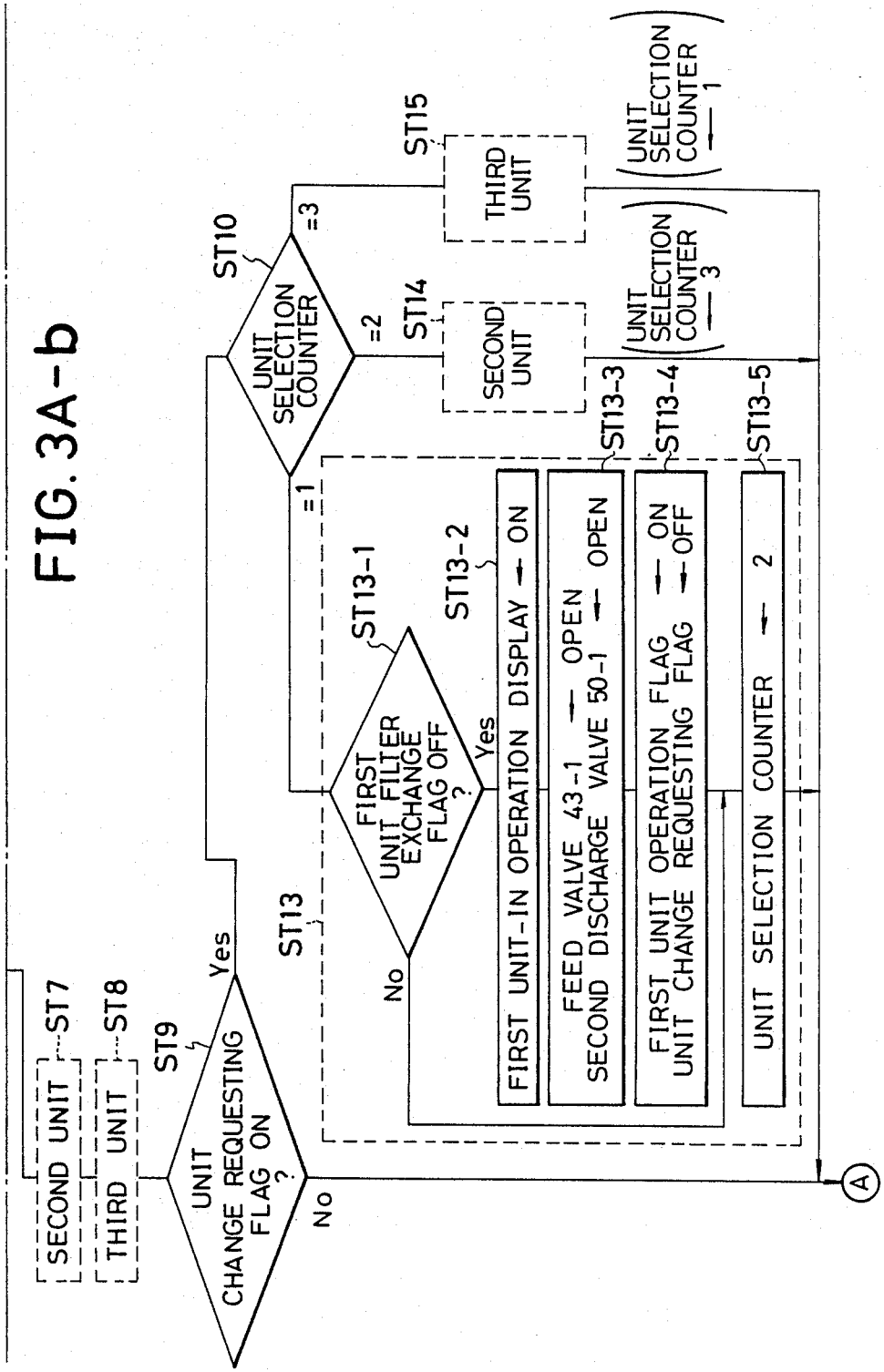

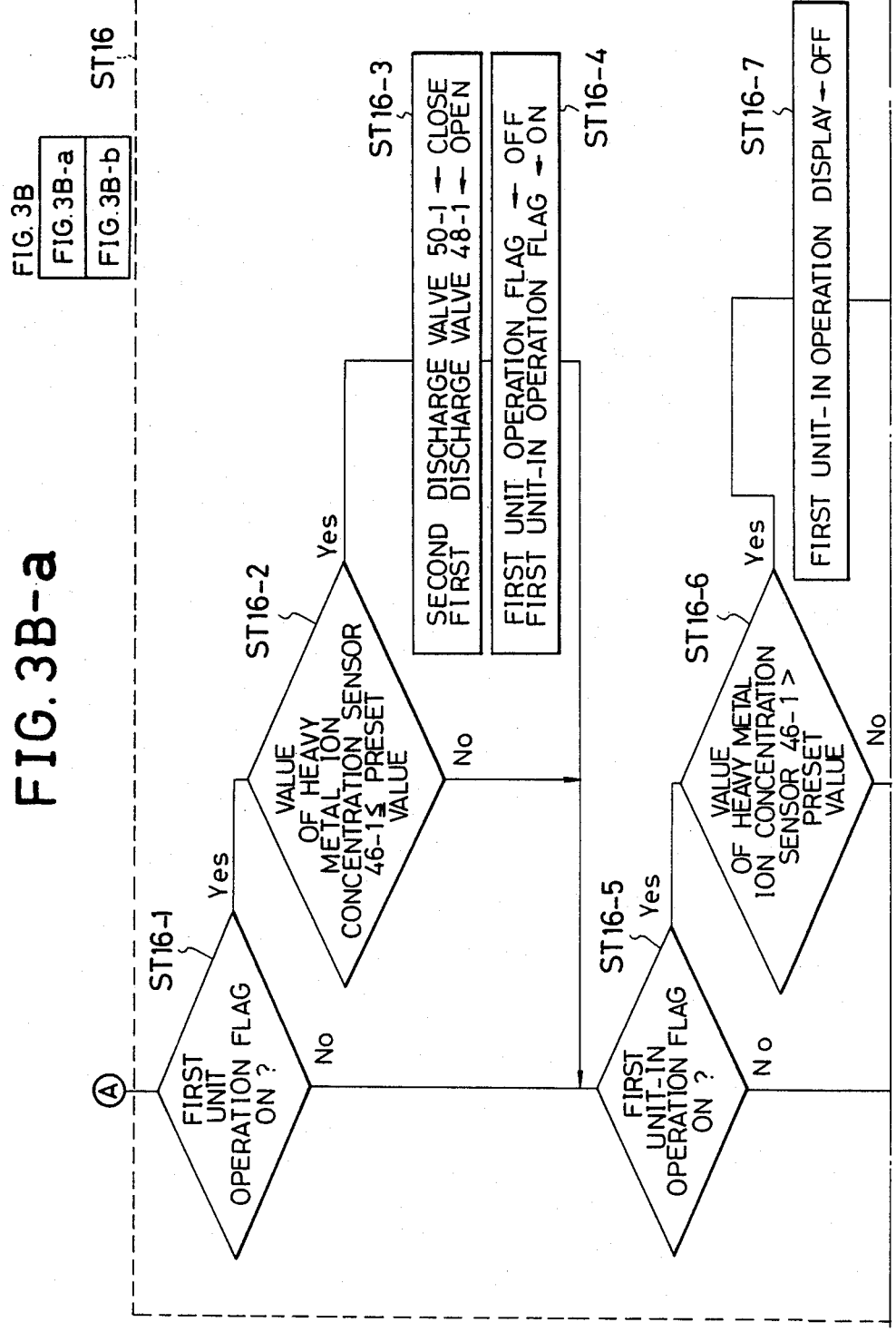

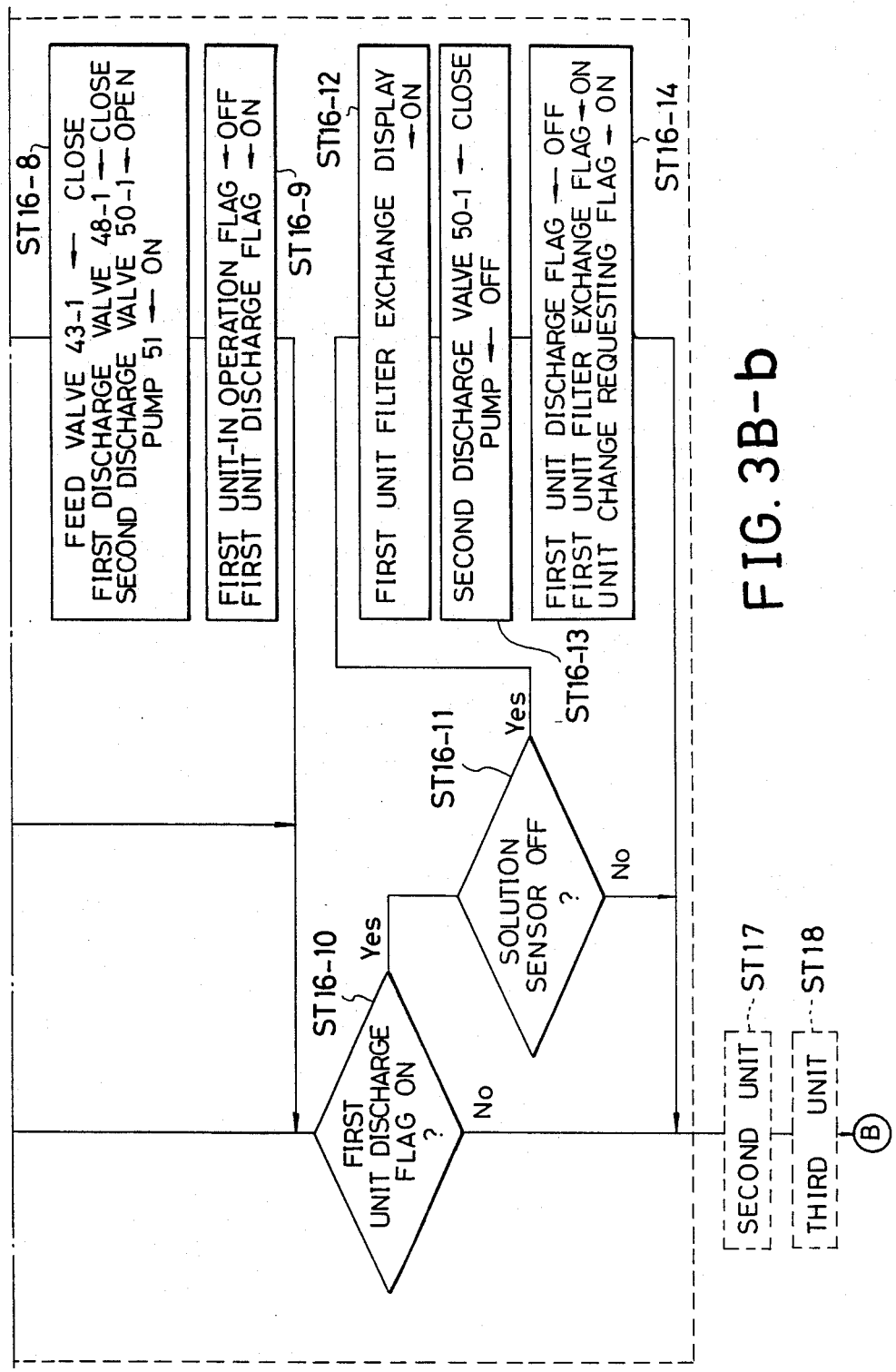
FIG. 3B-b

SYSTEM FOR PURIFYING DYE

This application is a continuation of application Ser. No. 635,285, filed July 27, 1984, now abandoned. This application is related to application Ser. No. 925,494, filed Oct. 29, 1984, which is a continuation of application Ser. No. 594,704, filed Mar. 29, 1984, now abandoned; application Ser. No. 54,052, filed May 26, 1987, which is a continuation of application Ser. No. 796,515, filed Dec. 8, 1985, now abandoned, a continuation of application Ser. No. 594,705, filed Mar. 29, 1984, now abandoned; U.S. Pat. No. 4,664,815 which issed on application Ser. No. 792,244 filed Oct. 30, 1985, a continuation of application Ser. No. 603,755, filed Apr. 25, 1984, now abandoned; U.S. Pat. No. 4,698,151, which issued on application Ser. No. 795,707, filed Nov. 6, 1985, a continuation of application Ser. No. 603,756, filed Apr. 25, 1984, now abandoned; and application Ser. No. 925,493, filed Oct. 29, 1986, a continuation of application Ser. No. 635,503, filed July 27, 1984, now abandoned.

BACKGROUND OF THE INVENTION

1. Field of the Invention

This invention relates to a system for purifying dye, particularly to a system for purifying dye capable of feeding continuously a purified dye which is suitable for preparation of a recording liquid suited for ink jet recording or writing implements (generally called as ink).

2. Description of the Prior Art

As the inks to be used for ink jet recording system, in which recording is performed by discharging the ink in the recording head through a discharging orifice by vibration with a piezoelectric vibrating element, etc., those containing various dyes or pigments dissolved or dispersed in a liquid medium comprising water or other organic solvents have been well known in the art. It is also known that similar inks can be used in writing implements such as felt pen, fountain pen, etc.

As an example of the basic constitution of such inks in general, there is a composition composed mainly of the three components of a water-soluble dye, water which is the solvent for the dye and a glycol which is the drying preventive.

Here, the water-soluble dye ordinarily contains inorganic salts such as sodium chloride, sodium sulfate, etc. and metal ions, especially heavy metal ions.

When an ink for recording is prepared with a dye containing such inorganic ions, the following inconvenience will be invited. That is, inorganic ions lower stability of the dye dissolved in the ink, whereby agglomeration or sedimentation of dye will be brought about. Also, in an ink jet recording head or a writing implement, if the liquid composition is changed by evaporation of the ink near the discharging orifice, precipitation of inorganic salts will be caused. Any of these may be a cause for clogging of the discharging orifice which should be avoided as the most undesirable trouble.

For the purpose of removing such troubles, it is necessary to control the inorganic ion concentration within a certain range in production of ink. This is indispensable when employing a commercially available dye in general containing inorganic ions as impurity for preparation of an ink for ink jet recording or an ink for writing implements.

SUMMARY OF THE INVENTION

An object of the present invention, in view of these points, is to provide a system for purifying dye designed to be capable of feeding continuously a purified dye solution which is suitable for preparation of ink for ink jet recording or ink for writing implements.

Another object of the present invention is to provide a system for purifying dye designed to be capable of producing continuously and automatically a purified dye solution which is suitable for preparation of ink for ink jet recording or ink for writing implements.

Still another object of the present invention is to provide a system for purifying dye designed to be capable of feeding a purified dye solution from which metal ions are removed and which is suitable for preparation of ink for ink jet recording, etc.

Yet another object of the present invention is to provide a system for purifying dye designed to be capable of producing efficiently a purified dye solution which is suitable for preparation of ink for ink jet recording, etc.

Further object of the present invention is to provide a system for purifying dye designed to be capable of producing continuously, automatically and on a large scale a purified dye solution which is suitable for preparation of ink for ink jet recording, etc.

Still another object of the present invention is to provide a system for purifying dye designed to be capable of producing smoothly a purified dye solution which is suitable for preparation of ink for ink jet recording, etc.

Other objects of the present invention will become apparent in the detailed description set forth below.

According to a first aspect of the present invention, there is provided a system for purifying dye, which comprises having a means for producing a dye solution and a means for treating the dye solution which captures metal ions in said dye solution by carrying out ion-exchange separation.

According to a second aspect of the present invention, there is provided a system for purifying dye, which comprises having a means for producing a dye solution, a means for treating the dye solution which captures metal ions in said dye solution by carrying out ion-exchange separation, a fractionation controlling means which fractionates the discharged solution from said treating means and a means for recycling a part of the fractionated solution to said treating means.

According to a third aspect of the present invention, there is provided a system for purifying dye, which comprises having a means for producing a dye solution and a plural number of means for treating solutions whih capture metal ions in said dye solution by carrying out ion-exchange separation.

According to a fourth aspect of the present invention, there is provided a system for purifying dye, which comprises having a means for producing a dye solution, a means for treating a dye solution which captures metal ions during passage of said solution and an operation controlling means which detects the concentration of said metal ions in the discharged solution from said treating means and controls the operation of said treating means based on the detected value.

BRIEF DESCRIPTION OF THE DRAWINGS

FIG. 2 composed of FIGS. 2a and 2b is a block diagram showing the controlling section in the system shown in FIG. 1; and FIG. 3A composed of FIGS. 3A-a and 3A-b and FIG. 3B composed of FIGS. 3B-a and 3B-b are flow charts showing the purifying operations in the treating units in the system shown in FIG. 1.

DETAILED DESCRIPTION OF THE PREFERRED EMBODIMENTS

Figure 1:
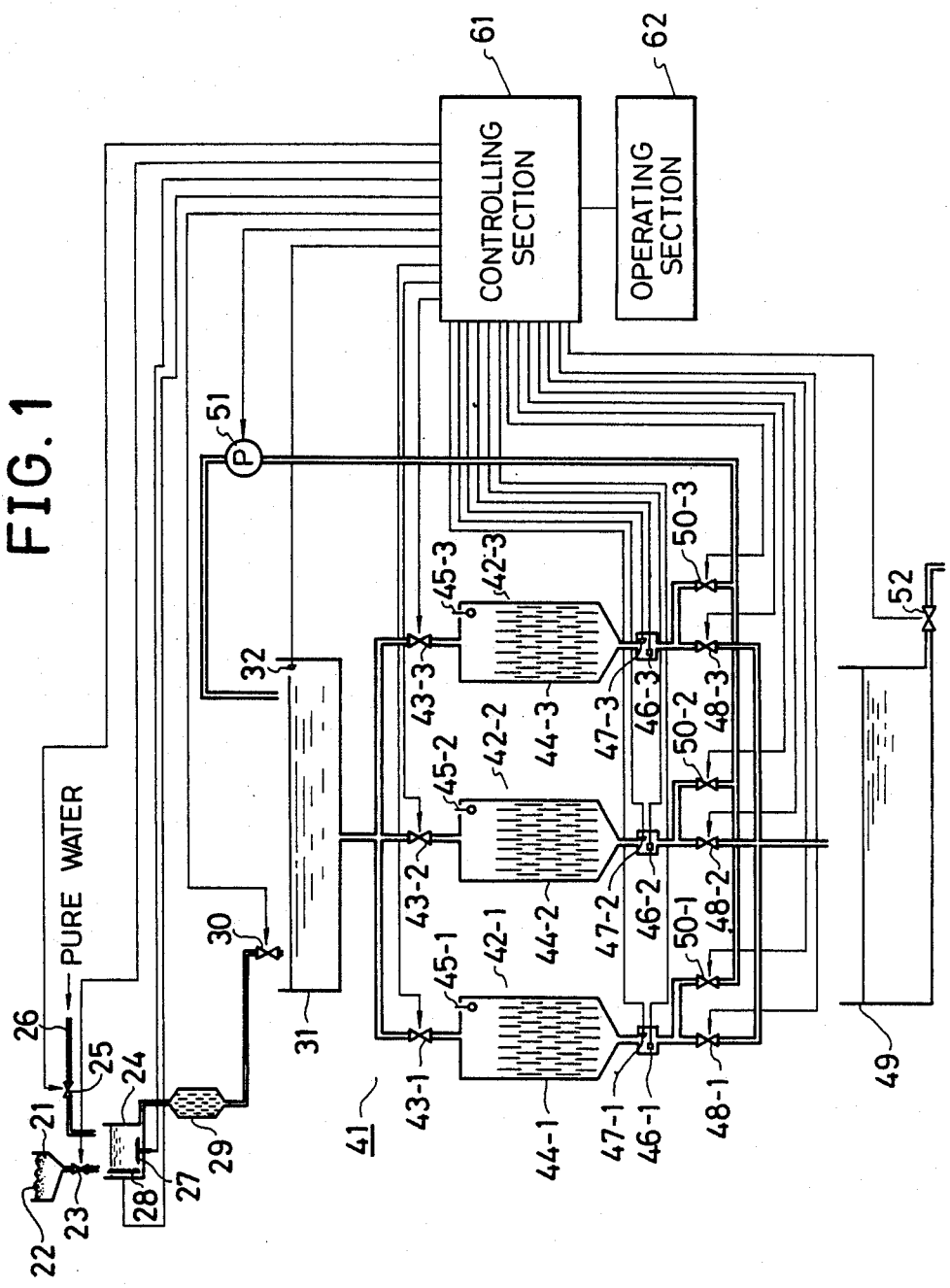
FIG. 1 is a schematic flow chart showing an example of the system according to the present invention.

Referring to the drawings, the present invention is described in detail.

FIG. 1 shows an example of the system of the present invention.

In this Figure, 21 is a dye feeding section containing dye powder 22 and the dye powder 22 is supplied through a dye valve 23 into a formulating tank 24. Also, into the formulating tank 24, pure water is fed through a pure water feeding pipe 26 having a pure water valve 25 interposed therein.

In the formulating tank 24, the dye powder 22 and pure water are mixed and dissolved by means of a formulating tank agitator 27 to prepare an aqueous dye solution. The amount of the aqueous solution residing in the formulating tank 24 is detected by a formulating tank liquid amount detector 28. In the aqueous dye solution obtained in the formulating tank, there remain particles of the dye powder not dissolved, and these are removed by filtration with a filter 29. For the filter 29, a conventional filter paper or Fluoropore (trade name: mfd. by MITSUI TOATSU Chemicals, Inc.), etc. may be available. The dye solution, removed of particles by passing through the filter 29, is fed to a feed tank 31 through a dye solution feed valve 30.

The feed tank 31 is provided with a feed tank liquid level sensor 32 and the liquid level in the feed tank 31 is controlled by opening-closing control of the dye solution feed valve 30 based on the output from the sensor.

Next, 41 is a purifying section for removing heavy metal ions from an aqueous dye solution, comprising a plurality of treating units, three units of the first to the third treating units 42-1, 42-2 and 42-3 in this example. In each treating unit 42 (42-1 - 42-3), the aqueous dye solution in the feed tank 31 is fed through the feed valve 43 (43-1–43-3) to the ion-exchange resin column 44 (44-1–44-3). The ion-exchange column 44 separates heavy metal ions from the aqueous dye solution through the so called ion-exchange separation. More specifically, through ion exchange in the column, heavy metal ions higher in absorption contained in the aqueous dye solution are captured by the ion-exchange resin and remain within the column. Here, within the column, a valve 45 (45-1–45-3) for control of the liquid level is provided to 0192control the amount of the aqueous dye solution fed into the column. The column 44 is also mounted detachably from the treating unit, and whether the column is mounted or not is detected by the filter exchange completion switch which is not shown.

Next, heavy metal ion concentration sensors 46 (46-1–46-3) are provided in the effluent solution passage at the lower end portion of the columns 44 to detect the heavy metal ion concentration in the effluent solution from the column 44. As the method for detecting heavy metal ion concentration, there may be employed the measurement method with the use of metal ion electrodes or the measurement method by atomic absorption spectroscopy. Solution sensors 47 (47-1–47-3) are similarly provided in the effluent solution passage to detect presence of the effluent solution in the effluent solution passage.

The effluent solution from the column 44 is discharged through a first discharge valve 48 (48-1 48-3) into a reservoir 49. Also, through a second discharge valve 50 (50-1–50-3), by the action of a circulating pump 51, the solution is recycled to the feed tank 31. Opening-closing control of both valves 48 and 50 is performed based on the detection result of the heavy metal ion concentration sensor 46 as described below.

The aqueous dye solution removed of heavy metal ions obtained in the reservoir 49 is taken out through the feed valve 52.

61 is a controlling section having the function of driving control of the respective sections, and 62 is an operating section provided with various kinds of displays, driving switches, etc.

FIG. 2 shows the control system in the system as shown in FIG. 1. In this Figure, 101 is a controller and has the function of driving control of the respective sections. 102 is a read-only memory (ROM) and memories the control program with the operational procedure as shown in FIG. . 3. 103 is a random access memory (RAM) and performs temporary memories of various kinds of data. 104 shows various kinds of switches arranged at the operating section 62, and sends various kinds of instruction signals through the input-output buffer circuits 105 to the controller 101. 106 is a display arranged at the operating section 62 and, as hereinafter described, has the first to the third unit filter exchange displays representing that column exchange in the respective treating units is necessary and the first to the third in-action displays representing that the respective units are in operation of purifying the aqueous dye solution. 107 is a drive circuit for performing display control of the display 106 based on the drive signal from the controller 101.

The detection outputs from the liquid amount detector 28 of the formulating tank and the liquid level sensor 32 of the feed tank are supplied to the controller 101 through the input buffer circuit 108. The drive circuits 110 to 114 are used for on-off control of respective loads (valves, 23, 25, 52, agitator 27, pump 51) based on the drive control signals supplied through the output buffer circuit 109 from the controller 101.

Next, 120 is the control system for the treating unit 42-1. Since the constitutions for the respective treating units are the same, other units 42-2 and 42-3 are omitted in the drawing. The detection signal from the heavy metal ion concentration sensor 46-1 is converted to digital signal through the A/D converter and then supplied through the input buffer circuit 122 to the controller 101. On the other hand, from the liquid sensor 47-1 is outputted a digital detecting signal and supplied through the input buffer circuit 122 to the controller 101. 123, 124 and 125 are drive circuits for opening or closing the respective valves 43-1, 48-1 and 50-1, respectively, and they are placed under on-off control by the drive signals supplied through the output buffer circuit 126 from the controller 101.

In the dye purifying means in this Example as constituted above, based on the detection signals by the heavy metal ion concentration sensor 46, treatment for removal of heavy metal ions is conducted while successively changing the respective treating units 44-1–44-3. This is because, there is limit in capacity of the ion-exchange resin within the ion-exchange resin column 44 of capturing heavy metal ions and, after absorption of a certain amount of heavy metal ions, no more ion-exchange separation is effected. As a result, the dye solution containing heavy metal ions is discharged as such and the heavy metal ion concentration in the effluent solution from the column 44 will be increased. By detection of the elevation of concentration, use of the ion-exchange resin column is no longer possible, and purification of the dye solution is conducted thereafter by either one of the two other columns. The ion-exchange resin column which has been made no longer useful is exchanged with a new column or the ion-exchange resin is subjected to regeneration treatment so as to be capable of purification in the same treating unit again.

FIG. 3 shows the operations in each of such treating units, wherein the respective flags perform the following judgements:

Unit filter exchange flag: flag which indicates exchange of filter, namely exchange of the ion-exchange resin column, and, when this flag is on, the corresponding unit filter exchange display gives a display that filter exchange is necessary;

Unit change demanding flag: flag demanding change of the treating unit, and, when this flag is on, the treating unit designated by the unit selection counter is selected, and the dye purifying operation is transferred to the treating unit selected;

Unit operating flag: flag which indicates that the corresponding treating unit is selected;

Unit-in operation flag: flag which indicates that the corresponding treating unit is in operation;

Unit discharging flag: flag which becomes on when the heavy metal ion concentration in the effluent solution from the column in the corresponding treating unit exceeds a setting value, and indicates start of recycle operation of the effluent solution to the feed tank 31 by the pump 51.

Next, the respective steps in FIG. 3 are explained.

In FIG. 3A, in the step ST1, the respective displays and data are initialized. In the step ST2, the treating unit change demanding flag is turned on and the content of the unit selecting counter is set on "1". In the step ST3, from the detection output from the feed tank liquid level sensor 32, it is judged whether a predetermined amount of dye solution is stored in the feed tank or not. When the desired amount of dye solution is stored, after closing the dye solution feed valve 30 in the step ST4, the operation proceeds to the step ST6. Whereas, when the desired amount is not attained, the feed valve 30 is opened in the step ST5 to feed the dye solution to the feed tank.

The step ST6 is the treating step when there is filter exchange demand in the first treating unit 42-1, and consists of the steps ST6-1 to ST6-3. First, in the step ST6-1, when it is judged that the first unit filter exchange flag is on, the operation proceeds to the step ST6-2 and judgement is made about whether the first unit filter exchange completion switch is on or not. When it is on, the operation proceeds to the step ST6-3, where the first unit filter exchange flag is turned off, simultaneously with extinction of the display on the first unit filter exchange display that exchange is necessary. Then, the operation proceeds to the step ST7. In the step ST6-1, if the filter exchange flag is off and the filter exchange completion switch is off in the step ST6-2, the operation should proceed to the step ST7 along the flow of "NO".

The step ST7 and the step ST8 are treating steps, respectively, when there are filter exchange demands for the second treating unit 42-2 and the third treating unit 42-3, and they have the same content as the step ST6 and therefore their explanation is omitted.

In the step ST9, it is judged whether the unit change demanding flag is on or not, and the operation proceeds to the step ST10 if the judgement is affirmative, while to the step ST16 in FIG. 3B, if it is negative. In the step ST10, judgement is made about the content of the unit selection counter, and the operation proceeds to the step ST13, if the content is "1", to the step ST14 when it is "2", and to the step ST15 when it is "3", respectively.

The steps ST13–ST15 are treating steps when the respective treating units 42-1 - 42-3 are selected. Since the content of each of the steps ST13–ST15 is the same, only the content of the step ST13 when the first treating unit 42-1 is selected will be explained. First, in the step ST13-1, it is judged whether the first unit filter exchange flag is off or not. If the judgement is negative, the operation proceeds to the step ST13-5, while to the step ST13-2, when it is affirmative. In the step ST13-2, the first unit-in operation display is turned on to indicate that the first treating unit 42-1 is in operation. In the step ST13-3, the feed valve 43-1 and the second discharge valve 50-1 are opened. Subsequently, in the step ST13-4, the first unit operation flag is turned on, simultaneously with turning off the unit change demanding flag. Next, in the step ST13-5, the content of unit selection counter is changed to "2" and then the operation proceeds to the step ST16. Here, the unit selection counter is a ring counter in which the content is changed in the order of "2", "3", "1" "2", . . . , and its content changes to "3" by performing the step ST14, and its content changes to "1" by performing the step ST15.

Next, the steps ST16, ST17 and ST18 in FIG. 3B are steps for controlling discharge of the effluent solution from the ion-exchange columns in the respective treating units. Since the content of each step is the same, only the content of the step ST16 for exhibiting control in the first treating unit 42-1 will be explained.

First, in the step ST16-1, it is judged whether the first unit operation flag is on or not. In the case of negative judgement, the operation jumps to step ST16-5, while it proceeds to the step ST16-2 in the case of affirmative judgement. In the step ST16-2, it is judged whether the heavy metal ion concentration in the effluent solution from the column detected by the heavy metal ion concentration sensor 46-1 is at a setting value or lower. If negatively judged, the operation proceeds to the step ST16-5, while to the step ST16-3 if affirmatively judged. In the step ST16-3, the second discharge valve 50-1 is closed and the first discharge valve 48-1 is opened. As the result, in the ion-exchange resin column 44-1, the aqueous dye solution removed of the heavy metal ions to a value not higher than the setting value is discharged into the reservoir tank 49 through the first discharge valve 48-1. Next, in the step ST16-4, the first unit operation flag is turned off and the first unit-in operation flag turned on before proceeding to the step ST16-5.

In the step ST16-5, it is judged whether the first unit-in operation flag is on or not. In the case of off-state, the operation proceeds to the step ST16-10, while to the step ST16-6 in the case of on-state. In the step ST16-6, it is judged whether the concentration detected by the heavy metal ion concentration sensor 46-1 is a value in excess of the setting value or not. When it does not exceed the setting value, the operation proceeds to the step ST16-10, while to the step ST16-7, when it is excessive. In the step ST16-7, the first unit-in operation display is turned off and then the operation proceeds to the step ST16-8, where the feed valve 43-1 and the first discharge valve 48-1 are closed. Further, simultaneously with opening of the second discharge valve 50-1, the circulating pump 51 is driven to commence recycle operation which recycles the effluent solution from the column 44-1 through the second discharge valve 50-1 to the feed tank 31. Then, in the step ST9, after the first unit-in operation flag is turned off and the first unit discharge flag is turned on, the operation proceeds to the step ST16-10.

Next, in the step ST16-10, it is judged whether the first unit discharge flag is on or not, and the operation proceeds to the step ST17 if it is off, or to the step ST16-11 when it is on. In the step ST16-11, it is judged whether the solution sensor 47-1 arranged in the passage of effluent solution from the column 44-1 is off or not, namely whether there remains the effluent solution in the passage of effluent solution. In the case when it is not in off-state, that is, when the solution is detected, the operation proceeds to the step ST17, or to the step ST16-12, when it is under off-state. The off-state means that all the aqueous dye solution having higher value of heavy metal ion concentration than the setting value discharged from the column 44-1 has been completely recycled to the feed tank 31. In the step ST16-12, the first unit filter exchange display is turned on to treating unit is necessary. Next, in the step ST16-13, while closing the second discharge valve 50-1, driving of the pump 51 is stopped to stop the recycle operation. Next, in the step ST16-14, while turning off the first unit discharge flag and turning on the first unit filter exchange flag, the unit change demanding flag is also turned on. Thereafter, the operation proceeds to the step ST17.

Subsequently, after following the steps ST17 and ST18, the operation returns again to the step ST3 shown in FIG. 3A.

By practicing the respective steps as described above, purification of the aqueous dye solution is effected in the respective treating units 42-1–42-3, whereby purified aqueous dye solution reduced in heavy metal ion concentration to lower than the setting value can be obtained in the reservoir 49.

In the above description, the case of controlling the heavy metal ion concentration in a dye solution has been explained. However, it should be understood that the dye purifying system according to the present invention is applicable for concentration control of other metal ions in a dye solution.

As described above, according to the present invention, by capturing metal ions in a dye solution by ion-exchange sepration, metal ions contained in the dye solution can be excluded, and therefore it is possible to produce a purified dye solution suitable for preparation of an ink for use in ink jet recording or writing implements. Further, according to the present invention, since such a dye solution can be produced continuously and automatically, a dye of high quality can be produced on a large scale.

Also, according to the present invention, because heavy metal ions in a dye solution are captured by practice of ion-exchange separation and the metal ion concentration in the dye solution after such ion-exchange separation is detected, it is possible to obtain a purified dye solution suitable for preparation of an ink for use in ink jet recording or writing implements based on the result of detection of the metal ion concentration.

Further, according to the present invention, because heavy metal ions in a dye solution are captured by practice of ion-exchange separation and the dye solution is separated after such ion-exchange separation, it is possible to obtain a purified dye solution excluding metal ions suitable for preparation of an ink for use in ink jet recording, etc.

Also, according to the present invention, metal ions in a dye solution are captured by practice of ion-exchange separation, the dye solution after such ion-exchange separation is subjected to fractionation, the dye solution from which metal ions are not excluded is recovered and again subjected to ion-exchange separation, whereby it is possible to produce a dye solution suitable for preparation of an ink for ink jet recording, etc. with good efficiency.

Further, according to the present invention, metal ions in a dye solution are excluded by a plural number of means for capturing metal ions in the dye solution by practice of ion-exchange separation, and therefore it is possible to produce a purified dye solution suitable for preparation of an ink for ink jet recording, etc. continuously, and automatically, and also on a large scale.

Also, according to the present invention, by providing a plural number of treating means for capturing metal ions in a dye solution by practice of ion-exchange separation and operating selectively one or two or more of these treating means to exclude the metals contained in the dye solution, production of a purified dye solution suitable for preparation of an ink for ink jet recording, etc. can be performed continuously and automatically.

Further, according to the present invention, by providing a plural number of treating means for capturing metal ions in a dye solution by practice of ion-exchange separation and displaying which one of these means is in state of operation, production of a purified dye solution suitable for preparation of an ink for ink jet recording, etc. can be performed smoothly based on this display.

Also, according to the present invention, by providing a treating means for capturing metal ions in a dye solution by practice of ion-exchange separation and controlling the operation of the treating means based on the metal ion concentration in the dye solution after practice of such ion-exchange separation, removal of metal ions from the dye solution can surely be done, whereby production of a purified dye solution suitable for preparation of an ink for ink jet recording, etc. can be performed smoothly.

Further, according to the present invention, by providing a treating means for capturing metal ions in a dye solution by practice of ion-exchange separation, judging whether renewal of the treating means is necessary or not based on the metal ion concentration in the dye solution after practice of such ion-exchange separation, and displaying so when it is necessary, removal of metal ions from the dye solution can surely be done, whereby production of a purified dye solution suitable for preparation of an ink for ink jet recording, etc. can be performed smoothly.

We claim:
1. A dyestuff solution refining system to purify an aqueous dyestuff solution containing metal ion contaminants comprising:

preparation means for producing a dyestuff solution;

refining means including (a) ion-exchange means for removing metal ions from said dyestuff solution; (b) transfer means for transferring said dyestuff solution to said ion-exchange means; (c) discharge means for discharging said dyestuff solution from said ion-exchange means; and (d) metal ion sensor means for detecting the metal ion concentration in said discharge dyestuff solution and for generating an output responsive to said detected metal ion concentration;

control means including (i) comparison means for receiving said output from said metal ion sensor means, for comparing said output with a predetermined value, and for generating an output responsive to differences between said detected metal ion concentration and said predetermined value, (ii) fractionation means for fractionating said discharged dyestuff solution in response to said output from said comparison means into a poriton having a metal ion concentration at or below said predetermined value and a portion having a metal ion concentration above said predetermined value; and (iii) circulation means for recycling said discharged dyestuff solution portion having a metal ion concentration above said predetermined value to said ion-exchange means; and a reservoir for collecting said discharged dyestuff solution portion having a metal ion concentration at or below said predetermined value.

2. A dyestuff solution refining system according to claim I, wherein said ion-exchange means removes heavy metal ions.

3. A dyestuff solution refining system according to claim 1, wherein said control means further includes a display means for displaying exhaustion of said ion-exchange means according to said output from said metal ion sensor means.

4. A dyestuff solution refining system to purify an aqueous dyestuff solution containing metal ion contaminants comprising:

preparation means for producing a dyestuff solution;

refining means including (a) a plurality of ion-exchange means in parallel series for removing metal ions from said dyestuff solution; (b) transfer means for transferring said dyestuff solution to each of said ion-exchange means; (c) discharge means for discharging said dyestuff solution from said ion-exchange means; and (d) metal ion sensor means for detecting the metal ion concentration in said discharged dyestuff solution and for generating an output responsive to said detected metal ion concentration;

control means including (i) comparison means for receiving said output from said metal ion sensor means, for comparing said output with a predetermined value, and for generating an output responsive to differences between said detected metal ion concentration and said predetermined value, (ii) fractionation means for fractionating said discharged dyestuff solution in response to said output from said comparison means into a portion having a metal ion concentration at or below said predetermined value and a portion having a metal ion concentration above said predetermined value; and (iii) circulation means for recycling said discharged dyestuff solution portion having a metal ion concentration above said predetermined value to said ion-exchange means; and a reservoir for collecting said discharged dyestuff solution portion having a metal ion concentration at or below said predetermined value.

5. A dyestuff solution refining system according to claim 4, wherein said control means further includes selection means for selecting one of said plural ion-exchange means to which said dyestuff solution is transferred and said discharged dyestuff solution is recycled.

6. A dyestuff solution refining system according to claim 5, wherein said control means further includes display means for displaying said selection of said selection means.

7. A dyestuff refining system according to claim 4, wherein said plural ion-exchange means remove heavy metal ions.

8. A dyestuff solution refining system according to claim 4, wherein said transfer means transfer said dyestuff solution to a first one of said plurality of ion-exchange means and said circulation means recycles said discharged dyestuff solution portion having a metal ion concentration above said predetermined value to a second one of said plurality of ion-exchanged means.

9. A process for purifying an aqueous dyestuff solution from a dyestuff containing metal ion contaminants above a desired concentration value comprising in sequence:

(1) preparing an aqueous dyestuff solution;

(2) contacting said aqueous dyestuff solution with ion-exchange resin thereby removing metal ions from said aqueous dyestuff solution;

(3) determining the metal ion concentraiton of said treated dyestuff solution;

(4) comparing said determined metal ion concentration of said treated dyestuff solution with the desired metal ion concentration value;

(5) passing to a reservoir the treated dyestuff solution having a metal ion concentration at or below said desired value; and (6) recycling to the metal ion removal step said treated dyestuff solution having a metal ion concentration above said desired value.

10. A process for purifying an aqueous dyestuff solution according to claim 9, wherein said contacting of the aqueous dyestuff solution removes heavy metal ions.

* * * * *

UNITED STATES PATENT AND TRADEMARK OFFICE
CERTIFICATE OF CORRECTION

PATENT NO. : 4,802,989                          Page 1 of 2

DATED : February 7, 1989

INVENTOR(S) : MASAHIRO HARUTA, ET AL.

It is certified that error appears in the above-identified patent and that said Letters Patent is hereby corrected as shown below:

COLUMN 1

Line 11, "Dec. 8, 1985," should read --Nov. 8, 1985,--.
    Line 13, "issed" should read --issued--.

COLUMN 3

Line 54, "0192" should be deleted.

COLUMN 4

Line 24, "FIG..3." should read --FIG. 3.--.

COLUMN 6

Line 34, "'1' '2'," should read --"1", "2",--.

UNITED STATES PATENT AND TRADEMARK OFFICE
CERTIFICATE OF CORRECTION

PATENT NO. : 4,802,989

DATED : February 7, 1989

INVENTOR(S) : MASAHIRO HARUTA, ET AL.

It is certified that error appears in the above-identified patent and that said Letters Patent is hereby corrected as shown below:

COLUMN 9

Line 20, "poriton" should read --portion--.
Line 32, "claim I," should read --claim 1,--.

COLUMN 10

Line 29, "transfer" (second occurrence) should be --transfers--.

Signed and Sealed this

Fifth Day of September, 1989

Attest:

DONALD J. QUIGG

Attesting Officer

Commissioner of Patents and Trademarks